United States Patent [19]
Barbot et al.

[11] Patent Number: 5,700,130
[45] Date of Patent: Dec. 23, 1997

[54] DEVICE FOR COOLING AND GAS TURBINE ROTOR

[75] Inventors: André M. Barbot, Cesson; Jacques E. J. Caruel, Maincy; Marcel R. Soligny, Chevilly-Larue, all of France

[73] Assignee: Societe National d'Etude et de Construction de Moterus d'Aviation S.N.E.C.M.A., Paris Cedex, France

[21] Appl. No.: 474,526

[22] Filed: Mar. 9, 1983

[30] Foreign Application Priority Data

Mar. 23, 1982 [FR] France .................. 82 04873

[51] Int. Cl.$^6$ ........................................ F01D 5/08
[52] U.S. Cl. .................... 416/95; 416/96 R; 415/115
[58] Field of Search ................. 415/115, 144; 60/39.75, 726; 416/90 R, 93 R, 95, 96 R

[56] References Cited

U.S. PATENT DOCUMENTS

| | | | |
|---|---|---|---|
| 2,928,650 | 3/1960 | Hooker et al. | 416/95 |
| 2,951,340 | 9/1960 | Howald | 60/39.75 |
| 3,814,539 | 6/1974 | Klompas | 416/95 |
| 3,989,410 | 11/1976 | Ferrari | 415/115 |
| 4,021,138 | 5/1977 | Scalzo et al. | 416/95 |
| 4,247,257 | 1/1981 | Benoist et al. | 416/221 |
| 4,415,310 | 11/1983 | Bouiller | 415/115 |
| 4,484,858 | 11/1984 | Kurosawa et al. | 416/95 |
| 4,522,562 | 6/1985 | Glowacki et al. | 416/95 |
| 4,648,799 | 3/1987 | Brown et al. | 416/95 |

FOREIGN PATENT DOCUMENTS

| | | |
|---|---|---|
| 1207772 | 2/1960 | France . |
| 2130011 | 11/1972 | France . |
| 2295238 | 7/1976 | France . |

Primary Examiner—Michael J. Carone
Assistant Examiner—Christopher K. Montgomery
Attorney, Agent, or Firm—Bacon & Thomas

[57] ABSTRACT

This device embodies a centrifugal compressor secured to a joint-carrier disk secured to an upstream flange of the rotor disk to be cooled. The recompressed air is ejected through channels near the roots of the blades of the disk.

11 Claims, 3 Drawing Sheets

DEVICE FOR COOLING AND GAS TURBINE ROTOR

BACKGROUND OF THE INVENTION

The present invention concerns a device for cooling a gas turbine rotor with air taken from the compressor at a relatively low pressure and supplied to the aforesaid turbine through their common shaft.

Cooling a gas turbine rotor with air taken from a suitable stage of the compressor associated with the gas turbine, then expanded in a centripetal system of blading, such as that described in the applicant's French patent 77 26637, the expanded air then being supplied to the turbine rotor through the common shaft, is known.

The process, also known, of cooling a gas turbine rotor with air taken from the associated compressor at a relatively high pressure lacks the various advantages of the procedure using air at a relatively low pressure: namely the air used to cool the turbine rotor also cools the aforesaid shaft as it circulates through the shaft; air leakage that can occur, in particular at the labyrinth joints, is much less than that when cooling air at high pressure is used; the air mass that is to cool the turbine rotor circulates first in contact with relatively large metallic masses, and this contributes to a kind of buffer effect, reducing thermal impacts in the event of a sudden deceleration of the turbine; and, finally, the choice of the compressor stage at which the air is taken off allows selection the cooling air pressure.

Sending air into the turbine at a relatively low pressure does however require increasing the cooling air pressure before moving the air toward or into the rotor rim and blades. Indeed, in some cases the cooling air must be ejected at a pressure on the order of 14 bars, even though the air pressure upon arrival in the turbine often is below this value. Different ways to recompress cooling air prior to its ejection already are known; the cooling air can be caused to flow into passages machined electrolytically in the mass of the rotor disk to be cooled, for example; the cooling air also can be recompressed by centrifugal systems of blades fitted to at least one of the faces of the rotor disk, between the input of the low pressure air at the bore of the rotor disk and the roots of its blades. These two known devices have the drawback of creating dissymmetries in the rotor disk to be cooled, causing local stresses. The need to take these latter into consideration is what makes it necessary to thicken the rotor disk, thus increasing its mass and inertia. Moreover, because of the necessary thickening of the rotor disk, the disk that carries the labyrinth joint must be secured further away from the median plane of the rotor disk, with the result an increase in the axial length of the planned arch between the rotor disk and the joint-carrier disk associated with it. This increase in the length of the arch makes its mechanical care uncertain.

French Patent 1,207,772 describes a gas turbine rotor cooling device in which cooling air flow through a stationary distributor installed in an airtight chamber managed on the downstream face of a rotor disk to be cooled, the labyrinth joints being planned between the fixed and movable parts to minimize air leaks. The mass air flow entering the chamber mentioned divides into one part that is used for direct cooling, that is, without recompression, of the blades and their respective roots, and into another part that is guided in a centripetal direction by small radial blades to cool the rotor disk bore.

French Patent 2,130,011 describes a device for compressing the cooling air before ejecting it toward the roots of the turbine rotor blades. This device is a centrifugal compressor driven by the turbine rotor and which is applied to the downstream face of the rotor disk, or is mounted some distance from it. In both cases the inlet to the rotating compressor is supplied via a fixed, complex circuit taking compressed air from the compressor associated with the turbine. Of course, the labyrinth joints must be designed to reduce cooling air leaks during the passage of air from the stator distributor into the rotating compressor.

French Patent 2,295,238 describes a centrifugal compressor for air designed to cool gas turbine stator blades. The rotation of this compressor is integral with that of the turbine rotor but the appropriate joints must be designed so as to limit cooling air leaks and to concentrate the air on the stator blades.

U.S. Pat. No. 2,951,340 describes a gas turbine rotor cooling device comprising a delimited chamber, on the upstream face of the rotor disk of which, on a plate, are secured the blades producing a centrifugal pumping effect in the aforesaid chamber, the upper part of which permits the just compressed cooling air to escape. Though the chamber cited is supplied with cooling air at a relatively short distance from the turbine axis, the air that is supplied in fact comes from the peripheral outlet of the compressor and its possible leaks still must be controlled by the labyrinth joints.

The devices for cooling a gas turbine rotor with air taken from the turbine compressor, and which are described in the above-mentioned inventions, have the following disadvantage in common: all these devices have airtight joints, generally of the labyrinth type, to control possible cooling air leakage as the air flows between a stationary and a movable part. There is a considerable variation in the quality of the tightness provided by joints such as these with gas turbine operating conditions, and in particular because of expansions, impact and thermal and mechanical stresses to which these joints are subjected. The use of airtight joints such as these in the circuits along which gas turbine rotor cooling air flows thus is a significant cause of inevitable variations in the rate of flow of cooling air and, as a result, in turbine rotor operating temperature.

SUMMARY OF THE INVENTION

The device for cooling a gas turbine rotor in accordance with the present invention is of the type that was indicated initially. It too has means for compressing the cooling air before it is ejected toward or into the rim and blades of the aforesaid rotor, and is characterized by the fact that these compression means are managed in an airtight circuit that is integral with the rotor disk, and which links the air supply, located in the rotor axis, with the cooling air ejection orifices without a discontinuity, passing outside the rotor disk, except if required inside the rotor disk rim.

The device in accordance with the present invention offers the following advantages over all previous developments of the art in addition to the advantages to be gained from using air taken from the compressor at a relatively low pressure to cool the gas turbine rotor. The cooling air flowing into the turbine from the associated compressor penetrates directly into the inlet of the airtight circuit where the compression means are located after having circulated through the common shaft without having to pass through one or several zones of discontinuity between stationary and rotating parts requiring the installation of airtight joints, of the labyrinth type in particular. It thus eliminates practically all cooling air leaks, leaks that vary as a function of turbine operating conditions in particular, thus facilitating the regulation of the turbine rotor operating temperature. Moreover, because most of the airtight cooling air circuit designed in accordance with the present invention is exterior to the rotor disk to be cooled, it no longer is necessary to machine the through radial passages in this latter. This thus does away with the disadvantages already cited and resulting from the need to increase the thickness of the rotor disk to prevent stresses from exceeding critical values. The result is a saving in the weight of a rotor disk with through radial channels, and this despite the additional weight of the airtight circuit exterior to this disk. Resistance to fatigue and, as a result, the life of a turbine rotor fitted with a cooling device in accordance with the present invention, are greatly enhanced. Fabrication of rotor disks is also simplified.

BRIEF DESCRIPTION OF THE DRAWINGS

Described in what follows, by way of examples, and shown schematically in the attached drawings, are several forms of the device in accordance with the present invention.

DETAILED DESCRIPTION OF THE PREFERRED EMBODIMENTS

Figure 1:
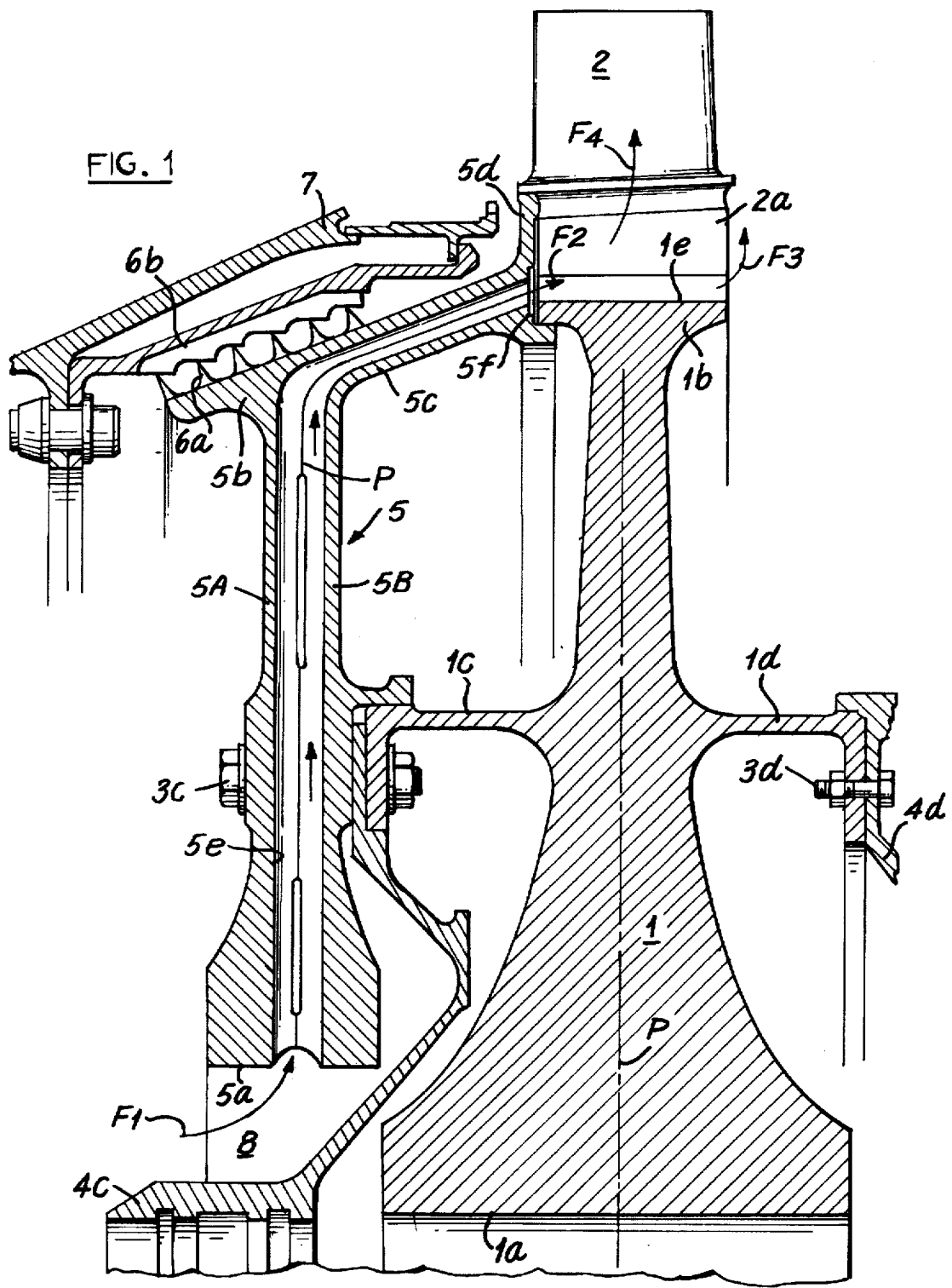
FIG. 1 is a partially sectional view through an axial halfplane, of a gas turbine rotor disk on which a first form of the device using air for cooling in accordance with the present invention is mounted.

The numeral 1 in FIG. 1, designates one of the disks of a gas turbine rotor. This rotor disk is embodied in the usual way such that its section through an axial halfplane is symmetrical with respect to a plane P perpendicular to the geometric axis of the rotor disk, the area of this transverse section decreasing from bore 1a of disk 1 that passes through the turbine shaft to rim 1b of the rotor disk. Rim 1b of disk 1 has a slight axial enlargement in the example shown, and supports roots 2a of blades such as 2 of rotor disk 1, secured by known means there is no need to describe in detail.

Rotor disk 1 in accordance with the present invention is solid, and this allows to reduce its means axial thickness to a value sufficient enough to enable transmission of the torque to the turbine shaft without the development of critical stresses during the various conditions under which the aforesaid turbine must operate. Rotor disk 1 therefore can be relatively light and, at the same time, have a very high resistance to fatigue, because of the absence of interior cavities. Its high mechanical resistance is further enhanced by its perfect symmetry with respect to plane P perpendicular to the turbine axis. This symmetry is retained despite the addition of two annular flanges, 1c and 1d, concentric with disk 1, in the median zones of the upstream and downstream faces of rotor disk 1, with which they are preferably integral. Whereas downstream flange 1d is secured by bolts, such as 3d for example, to a part of web 4d (shown in part only) that supports the rotor disk 1, its upstream flange 1c is secured by bolts such as 3c for example, to disk 5, which too is mounted on the turbine shaft and defines bore 5a, the diameter of which is greater than bore 1a of rotor disk 1, and rim 5b which carries labyrinth joint 6a. This latter works together with fixed complementary part 6b, which is integral with arch 7. Rim 5b of disk 5 is extended to the vicinity of rim 1b of rotor disk 1 and of roots 2a of its blades 2 in the form of truncated cone-shaped part 5c, which carries annular flange 5d, managed at a short axial distance from parts 1b and 2a in a manner such as to form an axial stop for roots 2a of blades 2.

The cooling air for rotor disk 1 in accordance with the present invention is taken from the compressor (not shown) associated with the gas turbine at a relatively low pressure in the manner described, for example, in the applicant's French Patent No. 77 26637, already cited. The air thus taken circulates through the shaft common to the compressor and turbine, and enters annular space 8 between bore 5a of joint-carrier disk 5 on the one hand and a member 4c secured to upstream flange 1c of rotor disk 1 by bolts such as 3c on the other hand. As indicated by arrow F1, the cooling air that flowed into annular space 8 enters the lower inlets of passages such as 5e, which latter are disposed inside joint-carrier disk 5. Passages such as 5e are arranged inside disk 5 in radial directions, and it is preferred that these passages have a continuously decreasing section from the disk bore at 5a. Each radial passage 5e is itself extended in truncated cone extension 5c by a somewhat narrower section tilted with respect to the turbine axis and terminating opposite root 2a of one of blades 2 of rotor disk 1. As indicated by arrow F2, the air flowing from the extension of each channel such as 5e can flow through longitudinal channel 1e, managed in rim 1b or in root 2a of blade 2. Arrow F3 shows that cooling air that has flowed through each channel such as 1e can cool the downstream face of root 2a of the corresponding blade. Finally, arrow F4 also shows that at least some of the air flowing from the extension of each radial channel such as 5e can flow through root 2a of a blade such as 2 to cool the insides of the blades. All these cooling actions are quite efficient to the extent that the cooling air, which had entered the lower ends of radial passages such as 5e at a relatively low pressure, was highly recompressed by centrifugation.

Preferably joint-carrier disk 5 is, in accordance with the present invention, comprised of two disks 5A and 5B secured to each other by welding or bolting. In this embodiment radial passages such as 5e are formed by radial notches made in the faces of the two disks 5A and 5B that are in contact, and in a manner such that the two coincide in the plane of the joint indicated by the thin solid line p in FIG. 1. Truncated cone-shaped extension 5c of disk 5 also can be made by butting two truncated cone-shaped extensions of disks 5A and 5B.

An annular groove in flange 5d is shown by solid lines in FIG. 1 and is designated 5f. It is located opposite roots 2a of blades such as 2 in order to distribute the cooling air led into this annular groove 5f by the extensions of radial passages 5e uniformly over the periphery of rotor disk 1.

The air cooling device in FIG. 1, and which has been described, thus offers the following advantages. The intake for the relatively low pressure air, located at the rotor axis, in particular in annular space 8, is connected without a break to the cooling air ejection orifices at flange 5d by an airtight circuit comprised in particular of radial channels such as 5e and their respective extensions, this airtight circuit being, like joint-carrier disk 5, itself integral with the rotor disk 1 to be cooled, and being managed so as to produce cooling air recompression by centrifugation in radial passages such as 5e. The cooling air taken from the compressor thus arrives in the zone in which it is to be used, at the blades of the rotor disk, having flowed exclusively through circuits the tightness of which does not depend on that of joints, labyrinth joints in particular. This guarantees regularity of the flow of cooling air under all turbine operating conditions, and the maintenance of the turbine's rotor disk at an approximately constant operating temperature. The additional weight resulting from the attachment of disk 5B to disk 5A, which should suffice to carry labyrinth joint 6a, is largely compensated for by the fact that rotor disk 1 can be solid, by the fact that it thus is unnecessary to increase its thickness in order to avoid the onset of critical stresses under certain turbine operating conditions. As compared with a rotor disk cooling device that uses cooling air taken at a relatively high pressure, the device shown in FIG. 1 and described above has the additional advantages of simplification and reduction in weight because there is no need to plan the inclusion of cooling air injectors.

The form shown in FIG. 2 differs from that shown in FIG. 1 and described above, only as follows. Disk 5, which carries labyrinth joint 6a and which is secured by bolts such as 3c, for example, to the upstream flange 1c of the rotor disk 1 to be cooled, is one piece, and two concentric series of sectors, approximately annular, such as 9A and 9B, are secured to the outside and inside of upstream flange 1c of rotor disk 1, flange 1c extending away from the upstream face of rotor disk 1 toward the middle of the radial expanse of this upstream face and having an axial width such that sectors 9A and 9B are well away from the corresponding parts of the upstream face of rotor disk 1. Each of the approximately annular sectors, such as 9A and 9B is, in accordance with the present invention, fitted with centrifugal blades 9A1 and 9B1 on the face opposite rotor disk 1 and are integral respectively with sectors 9A and 9B and abut the face of joint-carrier disk 5 facing rotor disk 1. If, for example, rotor disk 1 has sixty blades such as 2, each of the series of approximately annular sectors can have ten sectors such as 9A and 9B, for example, with each sector itself fitted with centrifugal blades such as 9A1 or 9B1, their number adequate to delimit six cavities among them. Two series of sectors such as 9A and 9B, their centrifugal blades, and the face of disk 5 to which these latter are applied thus form an internal compressor stage with respect to median flange 1c, and an external compressor stage, respectively, the relative arrangements of which are as follows. The inlets to the cavities delimited by blades such as 9A1 in the internal compressor stage are in direct communication with annular space 8, already defined above in the description of FIG. 1, and into which cooling air at relatively low pressure flows from one of the compressor stages after having circulated through the shaft common to the compressor and turbine. The outlets of the cavities delimited by centrifugal blades such as 9A1 in the internal compressor stage are located in the same respective radial planes as the inlets to the cavities delimited by centrifugal blades such as 9B1 in the external compressor stage, and the aforesaid outlets are connected to the aforesaid respective inlets by radial channels, such as 10, in an annular shoulder 5g by which joint-carrier disk 5 is secured to rotor disk 1 by bolts such as 3c, for example. Finally, the outlets from the cavities delimited by centrifugal blades such as 9B1 in the external compressor stage terminate without a break in holes, such as 11 in rim 1b of rotor disk 1 such that each of the passages 11 extends obliquely from upstream to downstream and from the interior to the exterior in the radial plane of rotor disk 1 and terminates at its rim 1b at roots such as 2a of blades such as 2.

According to other, but optional, advantageous features of the present invention, the approximately annular sectors such as 9A and 9B are preferably made of a composition material with high heat resistance, a carbon-based composition material of a known type, for example. On the other hand, each of the two series of annular sectors such as 9A and 9B are coupled in rotation with rotor disk 1 by two systems of teeth and lugs that engage each other. In the case of sectors such as 9A in the internal compressor stage, their respective faces turned toward rotor disk 1 present an annular series of equidistant teeth such as 12A near the innermost side of the corresponding sector that mesh in the spaces between the tenons 13A, themselves integral with the upstream face of rotor disk 1. Further, the innermost side of each of sectors 9B in the external compressor stage is fitted with equally spaced teeth that mesh between lugs such as 13B integral with flange 1c of rotor disk 1.

Figure 2:
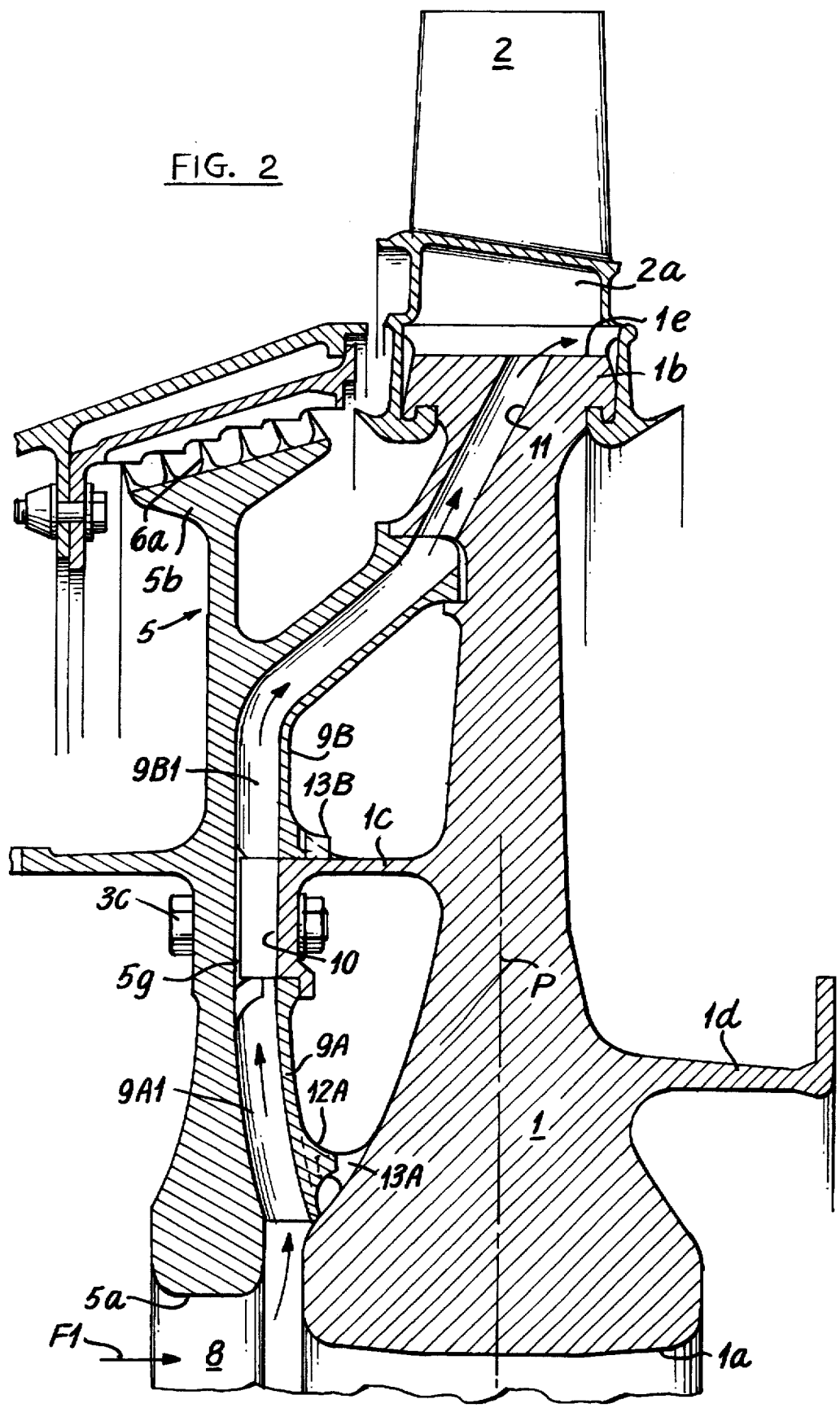
FIGS. 2 and 3 are views similar to that shown in FIG. 1, but for two other different forms of the device using air for cooling in accordance with the present invention.

In the case of this form of FIG. 2, the relatively low pressure air that enters annular space 8 is drawn in through the inlets to the internal compressor stage comprised of sectors such as 9A where it is subjected to first recompression. The air then flows through radial channels such as 10 to the inlets to the external compressor stage where it is subjected to a new increase in pressure before being ejected by oblique channels such as 11 toward the roots 2a of blades such as 2. The advantages that accrue are practically the same as those already mentioned in connection with the form of FIG. 1. The embodiment of each compressor stage in the form of practically annular sectors such as 9A and 9B is advantageous for so much it allows conciliating significant thermal expansions of the different members with the slight displacements due to the centrifugal forces to which they are subjected.

Figure 3:
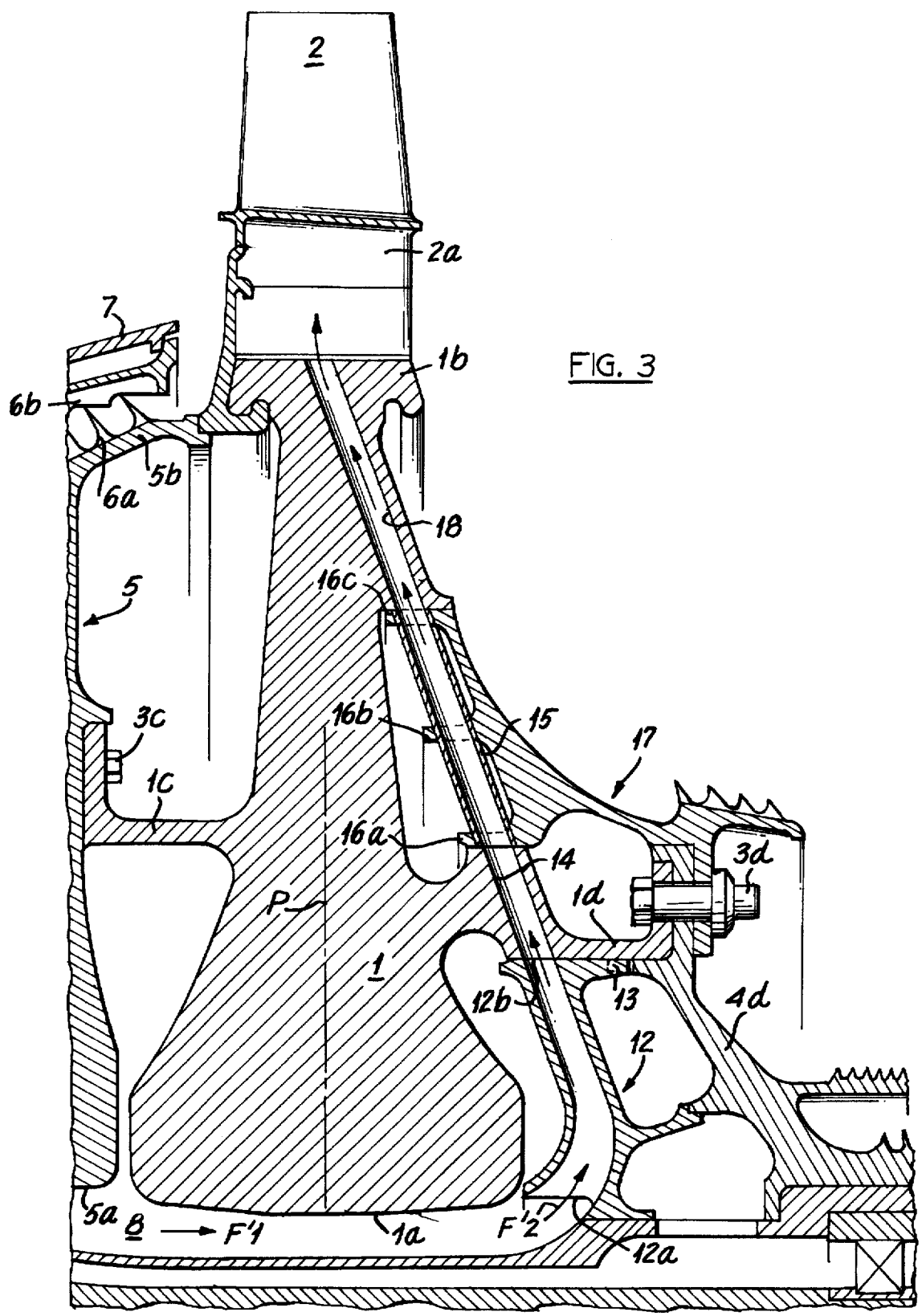

The form shown in FIG. 3 differs from those shown in FIGS. 1 and 2, and already described, only as follows. Downstream flange 1d of the rotor disk 1 has a slightly different form and carries a centrifugal impeller 12 coupled in rotation to the web 4d of rotor disk 1, and also secured to flange 1d by bolts such as 3d for example. The coupling of the working parts of impeller 12 and web 4d is by two systems of meshing teeth and tenons in the zone mentioned, designated 13. Centrifugal impeller 12, which too is mounted on the outside of rotor disk 1, but is integral with it in rotation, in particular through web 4d and downstream flange 1d, is of a size such that its inlets 12a are close to bore 1a of rotor disk 1. Outlets, such as 12b from the impeller terminate in respective radial channels such as 14, in the thickest part of flange 1d such that the axis of each channel 14 is in the radial plane of rotor disk 1, and is tilted from downstream to upstream, and from the interior toward the exterior of the rotor. Oblique radial passages such as 14 are extended in the direction of rim 1b of rotor disk 1 by tubes 15, carried by three concentric annular flanges, 16a, 16b and 16c, for example, with stepped diameters and themselves carried by a conical ferrule 17 secured by bolts such as 3d to downstream flange 1d of rotor disk 1. Finally, the outermost ends of tubes 15 terminate in air ejection channels 18 drilled in rim 1b of rotor disk 1 in extension of aforesaid tubes 15. As will be seen in FIG. 3, the axis of the outlets of impeller 12, passages 14, tubes 15 and channels 18 are in line. On the other hand, the transverse section of the channel with a straight axis thus formed decreases from outlet 12b of impeller 12 to that of ejection channel 18. According to another advantageous feature of the invention, it is possible to provide a noncircular section, an elliptical one, for example, for this channel with a straight axis, in particular for the internal passage of tube 15 and for passage 18.

The relatively low pressure cooling air that flows into annular space 8 inside bore 5a of joint-carrier disk 5 then flows through bore 1a of rotor disk 1 from upstream to downstream in the direction of arrow F1, thus ensuring the cooling of the corresponding very thick part 1a of rotor disk 1. As is indicated by arrow F2, the low pressure air then is drawn into inlets such as 12a in centrifugal impeller 12, providing first recompression. The air then flows successively from outlets such as 12b of centrifugal impeller 12 through passages 14, tubes 15 and ejection channels 18 undergoing a new increase in pressure, the result of centrifugation, before being ejected at an adequately high pressure at roots 2a of blades such as 2. Recompression of cooling air obtained with the device in accordance with the present invention can be quite high because of the long length of straight channel 14-15-18 in particular. This form of the cooling device in accordance with the present invention offers the additional advantage of being located on the side of the downstream face of the rotor disk to be cooled, that is to say, on the face farthest from the zones of the disk that transmit the torque to the shaft.

The present invention is not limited to the forms described in the foregoing. It includes all their variants, in particular those obtained by associating with each form described the same form of symmetrical embodiment with respect to plane P of the disk, any other individual form, or by reversing the forms described above in the upstream-downstream direction.

We claim:

1. A device for cooling the rotor of a gas turbine rotatable about a rotor axis, the gas turbine having a compressor, with relatively low pressure air taken from the compressor and supplied to the turbine through a common shaft, said device including means for compressing the cooling air comprising a disk forming an airtight circuit integral and rotatable with the rotor, the disk having an air intake adjacent to the rotor axis and cooling air ejection orifices, the airtight circuit communicating with the air intake and ejection orifices without a discontinuity for directing air to parts to be cooled while compressing the air, the disk further comprising a labyrinth joint, and being secured to an annular flange of the rotor on one side of the rotor, wherein the airtight circuit comprises radial passages inside the disk.

2. The device in accordance with claim 1 wherein the disk is formed by two disks secured to each other, wherein the radial passages are formed by radial notches in contact faces of the two disks such that the notches coincide with each other when the two disks are secured to each other.

3. The device in accordance with claim 1 wherein the disk has an annular flange forming an axial stop for blades on the rotor wherein the ejection orifices are spaced annularly to an outer rim of the rotor disk and roots of the blades.

4. The device in accordance with claim 1 wherein the airtight circuit formed by the disk forms a centrifugal compressor.

5. The device in accordance with claim 4 wherein the centrifugal compressor comprises at least one series of generally annular sectors made of a high heat-resistant composition material, wherein each of these sectors are located on a face of the disk facing the rotor.

6. The device in accordance with claim 5 wherein the centrifugal compressor comprises internal and external stages, each formed respectively by concentric series of generally annular sectors secured to an outside and to an inside of a median flange securing the disk to the rotor, an outlet of the internal stage in communication with an inlet to the external stage by radial passages in the disk, an outlet from the external stage in communication with air ejection channels in a rim of the rotor.

7. The device in accordance with claim 6 wherein each of the series of annular sectors is coupled to the rotor by meshed teeth and lugs one of which is integral with one series of sectors, and the other is integral with a corresponding face of the rotor.

8. The device in accordance with claim 1 wherein the disk forming the airtight circuit comprises an impeller mounted on the outside of and integral with the rotor, the impeller having inlets adjacent to a central axial bore of the rotor, outlets terminating in radial passages arranged on the outside of and integral with the rotor in a radial plane of the rotor, the radial passages each having a transverse section that decreases in a direction extending away from its inlet.

9. A device for cooling the rotor of a gas turbine, the rotor having front and rear faces and being rotatable about a rotor axis, the gas turbine having a compressor, with relatively low pressure air taken from the compressor and supplied to the turbine through a common shaft, said device including means for compressing the cooling air comprising a disk forming an airtight circuit integral and rotatable with the rotor, the disk having an air intake adjacent to the rotor axis and cooling air ejection orifices, the airtight circuit communicating with the air intake and ejection orifices without a discontinuity, for directing air to parts to be cooled while compressing the air wherein the airtight circuit includes an impeller mounted on the outside of and integral with the rotor, inlets to the impeller being located adjacent to a central axial bore of the rotor, outlets terminating in radial passages arranged, on the outside of and integral with the rotor in a radial plane of the rotor, the radial passages each having a transverse section that decreases in a direction away from its inlet and, wherein the impeller and the radial passages are arranged spaced from the rear face of the rotor, the cooling air flowing through the central bore of the rotor from front to rear before entering the impeller.

10. The device in accordance with claim 9 wherein the impeller is coupled with a web secured to a rear flange on the rotor by two systems of meshed teeth and tenons, the radial passages being secured to the rear flange by concentric annular flanges with stepped diameters and which are carried by a tapered ferrule secured to the rear flange.

11. The device in accordance with claim 9 wherein outlets of the radial passages communicate with ejection channels in a rim of the rotor.

* * * * *